United States Patent [19]
Therasse et al.

[11] Patent Number: 5,383,182
[45] Date of Patent: Jan. 17, 1995

[54] RESEQUENCING DEVICE FOR A NODE OF A CELL SWITCHING SYSTEM

[75] Inventors: Yves Therasse, Chastre; Pierre-Paul F. M. M. Guebels, Keerbergen, both of Belgium

[73] Assignee: Alcatel N.V., Amsterdam, Netherlands

[21] Appl. No.: 152,594

[22] Filed: Nov. 12, 1993

[30] Foreign Application Priority Data

Nov. 30, 1992 [EP] European Pat. Off. ............ 92203694

[51] Int. Cl.6 ...................... H04Q 11/04; H04L 12/56
[52] U.S. Cl. ...................................... 370/60; 370/94.1
[58] Field of Search ........................ 370/60, 60.1, 94.1, 370/58.1, 58.2, 58.3, 91, 92, 93, 94.2, 99, 110.1, 825.52, 825.51, 825.5

[56] References Cited

U.S. PATENT DOCUMENTS

| | | | |
|---|---|---|---|
| 5,127,000 | 6/1992 | Henrion | 370/60 |
| 5,173,897 | 12/1992 | Schrodi et al. | 370/60 |
| 5,214,639 | 5/1993 | Henrion | 370/60 |
| 5,253,251 | 10/1993 | Aramaki | 370/94.1 |
| 5,291,483 | 3/1994 | Nagai et al. | 370/96.1 |

FOREIGN PATENT DOCUMENTS

| | | |
|---|---|---|
| 9102419 | 2/1991 | WIPO. |
| 9102420 | 2/1991 | WIPO. |
| 9108633 | 6/1991 | WIPO. |

Primary Examiner—Douglas W. Olms
Assistant Examiner—Huy D. Vu
Attorney, Agent, or Firm—Ware, Fressola, Van Der Sluys & Adolphson

[57] ABSTRACT

The device is for telecommunication networks with an asynchronous transfer mode and contains, in particular:
- a time stamp generator (TSG), for assigning a time stamp to each cell;
- a buffer memory (BM);
- an address memory (FSAM) to memorize the address of the first sub-cell of each cell;
- a linking memory (LM);
- a circuit (CU) for finding the buffer memory address containing the first sub-cell of a cell; this circuit comprises, in particular: a memory that is accessible by its content, for memorizing the waiting cell identifiers, each containing the identity of a time period during which the waiting delay of the cell expires, and of the identity of at least one output from which the cell is to be emitted; and a queuing memory for each output, where the order number is recorded each time the waiting delay of at least one cell, which must be emitted from that output, expires; each queuing memory is of the type accessible by its content, and the numbers are searched in ascending order when this output becomes available.

4 Claims, 2 Drawing Sheets

RESEQUENCING DEVICE FOR A NODE OF A CELL SWITCHING SYSTEM

CROSS-REFERENCE TO RELATED APPLICATION

This application discloses subject matter that is disclosed and may be claimed in copending application U.S. Ser. No. 08/52,452 filed on even date herewith and that claims priority from EPO Application 92203695.9, filed Nov. 30, 1992.

TECHNICAL FIELD

The invention concerns a resequencing device for a node of a cell switching system. It particularly concerns switching systems in which the cells are of variable length, where each cell can consist of a number of fixed length sub-cells.

BACKGROUND OF THE INVENTION

Each time these cells pass through a node of a switching system, each is subjected to a variable delay as a function of the path inside the switching network containing this node. The sub-cells of a same cell are linked in such a way, that they follow the same path and are subjected to the same delay. The sub-cells of a same cell therefore maintain their initial order at the switching network output; by contrast, the cells do not always maintain their initial order because of the delay dispersion. A resequencing device has the function of resetting these cells to their initial order.

European Patent Application No. 0,438,415, corresponding to International Publication No. WO 91/02419 and U.S. Pat. No. 5,127,000, describes a resequencing process that consists in retarding each cell by a determined delay in a way that the total delay imposed by the switching network and the resequencing device has a constant value for all the cells, where this value is generally chosen larger than the maximum delay the switching network can create. If the total delay is less than the maximum delay value the switching network can create, the probability of disturbing the initial order is not zero, it is a function of the chosen value of the total delay. This known process has two variations.

A first variation consists in: assigning a time stamp to each cell entering the switching network, which indicates at what moment the cell entered the switching network; to extract the time stamp from each cell leaving the switching network; to store each cell leaving the network until the time indicated by the time stamp generator is the same as the time indicated by the cell's time stamp, plus the chosen total delay; then to allow the cell to be transmitted through a resequencing device outlet. The transmission actually takes place as soon as the outlet and the cell's destination are available.

According to this variation, the initial order of the cells is restored without the need to measure or estimate the delayed transition of each cell through the switching network. By contrast, the time furnished by the time stamp generator must be available in a device located at the network input for the assignment of time stamps, and must be simultaneously available in a resequencing device located at the network outlet, to allow each cell to be transmitted at a convenient moment.

According to another variation of this known process, each cell leaving the network is assigned a label whose value is an estimate of the delay undergone by the cell during its passage through the network; and to subject each cell to an additional delay whose length is equal to the difference between the predetermined value of the total delay and the estimated value of the delayed passage through the network, where the latter is read from the label associated with each cell. This variation has the advantage of not needing a device to assign time stamps to the cells arriving at the inputs of the switching network.

This patent application also describes a resequencing device that uses the first variation of the process mentioned above, for cells that each consist of a variable number of fixed length sub-cells. Each output of a node is equipped with one of these devices. The device contains:

- a first time stamp generator which supplies a value incremented by one unit for each time interval corresponding to a sub-cell, with a cycle length at least equal to the total predetermined delay so that all cells are uniformly delayed;
- a buffer memory with one input coupled to an input of the resequencing device, and with an output coupled to an output of the resequencing device; where each memory address has a capacity that is equal to one sub-cell;
- a control circuit for this buffer memory, to supply the addresses of free sites in this buffer memory for storing the sub-cells of each cell received by the resequencing device;
- a read/write pointer associated with the buffer memory;
- a memory of addresses with the sites corresponding respectively to the various possible time stamp values; each site of this address memory stores a starting and an ending pointer of the list which are the respective addresses in the buffer memory, of the first and the last sub-cell of a series containing all the cells having the same time stamp;
- a link memory with the same addresses as the buffer memory, to retain the links between the addresses of all the sub-cells having the same time stamp, and to retain the links between the addresses of the sub-cells belonging to the cells to be transmitted in succession;
- a write pointer associated with this address memory to store in each site the first and the last address of a list of site addresses of the buffer memory, containing all the sub-cells of all the cells with the same time stamp;
- a read pointer associated with the address memory, with a cyclic function, to successively read the contents of the sites in this address memory, in order to read sub-cells in the buffer memory in addresses that correspond to time stamps that cross in a regular manner.

When the delay of a series of cells with a given time stamp expires, in other words when the time indicated by the label generator is equal to the sum of the given time stamp and the predetermined total delay, the first and the last storage address of this series are read in the site of the address memory corresponding to this time stamp. The link memory then supplies the complete series of addresses and permits reading in the buffer memory all the sub-cells of all the cells having the time stamp being considered. These cells are read in an order that is defined by the links in the link memory, but this order has no importance since all cells have the same time stamp and are addressed to a same output. The link memory is furthermore used to tie the different series of sub-cells from cells with successive time stamps in the same waiting line, which ensures their transmission in proper order. This linkage takes place by letting the link memory make the end of the series of sub-cell addresses of a cell correspond to the start of the series of sub-cell addresses of the cell to be transmitted next.

The first inconvenience of this device is that it cannot reset the order of cells arriving at the same input, which are intended for several outputs, in particular if the same cell is to be diffused to several outputs. This inability results from the function principle of this known device, because it is necessary to store, in each site of the address memory, a starting address of the address series and an ending address of the address series of the sub-cells; and it requires a link memory to link all the sub-cells that will subsequently be emitted from the same output. The resequencing devices associated with the different outputs of a node thus function independently of each other.

This known device has the further inconvenience of not permitting long cell lengths. Each site of the address memory corresponds to a unit of time of the generator that produces the time stamps. This unit of time is equal to the duration of a sub-cell. The time stamp generator does not have infinite capacity. It therefore periodically produces identical label values. Each site of the address memory is read with a constant period, at most equal to the period of the time stamp generator. At the moment a site is read, the make-up of the list must be terminated, so that an address from the end of the list can be properly read in the site under consideration. Thus, the period of the time stamp generator limits the number of sub-cells corresponding to that list, and finally limit the number of sub-cells each cell can contain.

Furthermore, it is not possible to increase the period of the time stamp generator indefinitely, because this requires increasing the number of bits of each cell to form a time stamp.

DISCLOSURE OF INVENTION

A first goal of the invention is to propose a resequencing device that permits the diffusion of one cell from one input to several predetermined outputs of the resequencing device. A second goal of the invention is to propose a resequencing device that is easier to adapt to accept cells composed of a large number of sub-cells.

The objective of the invention is a resequencing device for a node of a cell switching network, where each cell consists of a variable number of sub-cells of a fixed length, and the node includes a switching network that transmits cells with variable first delays, and all the sub-cells of the same cell undergo a first delay; this resequencing device includes means for storing all the cells that have been transmitted through the switching network, then to emit them through at least one output of the resequencing device, after the end of several waiting delays that constitute delay seconds such as, for each cell, the sum of the first and the second delay, which equals a predetermined value that is identical for all the cells; these means include:

- a buffer memory for storing all the sub-cells of each cell received by the resequencing device;
- an address memory to enter the address of the buffer memory containing the first sub-cell of each cell;
- means to find the address in the address memory that contains the first sub-cell of a cell, after the waiting delay of the latter has expired, and an output to emit this cell is available; characterized in that the means to find the address of the buffer memory containing the first sub-cell of a cell, which means contain:
- a memory of waiting cells, of the type that is accessible by its content, to memorize an identifier of the waiting cell when a cell is stored in the buffer memory; this identifier is stored in an address that is identical to the one where the address FSA of the first sub-cell is stored in the address memory; the identifier is composed of a time stamp that identifies a time interval during which the waiting delay of that cell expires, and the identity of at least one output through which it is to be emitted;
- means to find the identifier of each cell in the waiting cell memory when the waiting delay expires, and for each found identifier to supply the address of the waiting cell memory containing this found identifier;
- queuing memories, respectively associated with the outputs of the node, and accessible by their content, to memorize an order number for each cell intended for the output associated with the memory under consideration;
- means to determine and record an order number in a queuing memory, at the address supplied by the means to find the identifier of each cell when its waiting delay expires;
- means to find, in an ascending order, each number entered into the queuing memory of an output, when this output becomes available; and to restore the address in this queuing memory containing the found number; and
- means to read an address of a first sub-cell in the address memory, to the address restored by the means to find each number.

The device characterized in this manner is compatible with a diffusion because it is associated to all the outputs of a node, and because the waiting cell memory stores identifiers, where each can contain several identities of intended outputs.

Furthermore, it is easier to realize for long length cells, because the identifier of a waiting cell can be entered into this memory without waiting that all the sub-cells of this cell have actually been received by the node. The first sub-cells of a cell can therefore be emitted through an output, even before the last sub-cells have been received.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
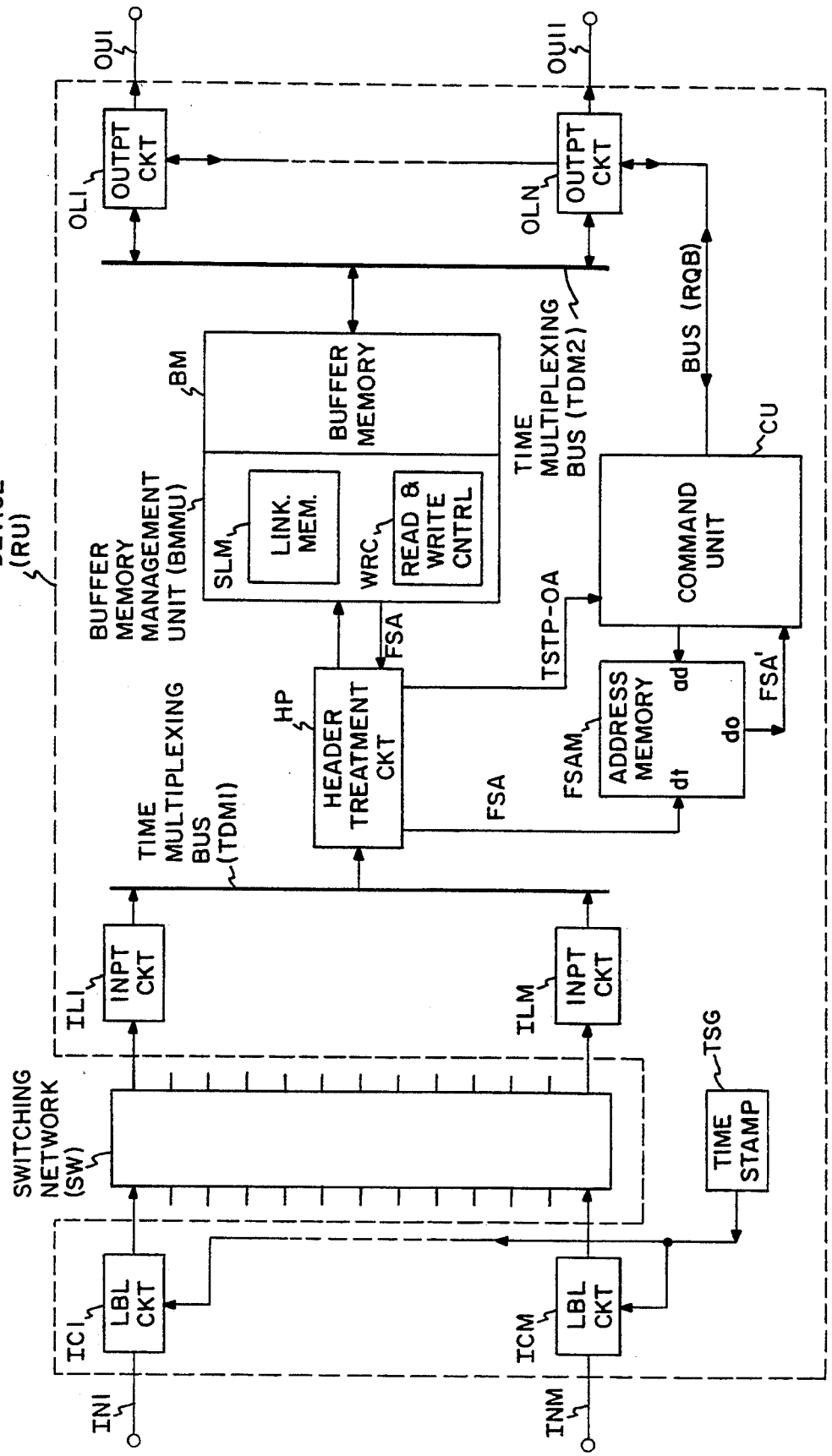
FIG. 1 is the synoptic diagram of a configuration example according to the invention, linked to a switching network to form a node of a cell switching system.

FIG. 1 represents a node of a telecommunications network with asynchronous transfer mode, which contains a switching network SW and a configuration example RU, of the resequencing device according to the invention. This node contains M inputs IN1, . . . , INM, and N outputs OU1, . . . , OUN. This configuration example of resequencing device RU contains:

- M labeling circuits IC1, . . . , ICM, where each has one input linked respectively to an input IN1, . . . , INM of the node, one output linked respectively to one of N inputs of the switching network SW, and a common input;
- M input circuits IL1, . . . , ILM where each has one input linked respectively to one of M outputs of the switching network SW, and one output linked to a time multiplexing bus TDM1;
- one cell header treatment circuit HP, with a first input linked to the bus TDM1;
- one command unit CU which will be detailed later and contains a first input linked respectively to a first output of the header treatment circuit HP;
- a time stamp generator TSG, having one output linked to the common input of the labeling circuits IC1, . . . , ICM; this generator is composed of a clock and a counter, not illustrated, to supply a time stamp value incremented by one unit for each interval of time corresponding to one sub-cell, from 0 to TSTPmax, of the TSTPmax module;
- a buffer memory BM associated with a buffer memory management unit BMMU, where this assembly has one input linked to a second output of header treatment circuit HP, one output linked to a second input of circuit HP, and one input-output linked to a time multiplexing bus TDM2.;
- a memory FSAM called address memory, which has one data input linked to a third output of circuit HP, one address input 'ad' linked to an output of unit CU, and one output 'do' linked to a second input of unit CU;
- N output circuits OL1, . . . , OLN, each of which has one input-output linked to bus TDM2, one output linked respectively to one of outputs OU1, . . . , OUN of the node, and one input-output linked to a bus RQB, which itself is linked to an input-output of command unit CU.

The inputs IN1, . . . , INM receive fixed or variable length cells, each formed of sub-cells, all with the same number of bits and the same length, where this length is called the sub-cell period. The device according to the invention is particularly adapted for the treatment of variable length cells. These cells are switched by the switching network SW by routing all sub-cells of a same cell over the same path and maintaining the continuity of the cell, in other words without interlacing sub-cells belonging to different cells. This allows assigning a unique time stamp to all the sub-cells constituting one cell. This time stamp indicates the time interval during which the first sub-cell of the cell under consideration is received at one of the inputs IN1, . . . , INM.

The label permits to resequence the cells leaving the switching network SW: the first sub-cell is authorized to leave the node when its waiting delay expires, in other words during the time period when the generator TSG indicates a time equal to the sum of the time stamp value that was assigned to the cell, and a fixed value. But there is an additional condition for the cell to be emitted: the output for which this cell is intended must be available. Otherwise the cell under consideration must wait until the output becomes available.

Each sub-cell starts with two bits called the sub-cell control field. In the first sub-cell of each cell, these two bits have a value of 11, for example. In all other sub-cells, except the last one, these two bits have a value of 00, for example. In the last sub-cell, these two bits have a value of 01, for example. The first sub-cell furthermore contains a field called cell control header. This field, in particular, contains the identity of the output that will emit this cell, or that of several outputs in case of a diffusion. The other sub-cell bits transmit data.

The labelers IC1, . . . , ICN have the function of inserting, in the cell control field of each cell, a time stamp furnished by the generator TSG, at the moment when the first sub-cell of this cell is received by the node. This time stamp TSTP indicates the time period during which the waiting delay of the cell will expire. It is determined as a function of counter TSG at the moment this cell arrives, and as a function of the total predetermined delay that each cell must undergo. In a preferred configuration, a TSTPmax module of the counter is selected equal to this predetermined total delay, the value of the time stamp TSTP is then numerically equal to the value furnished by the counter, because of the TSTPmax module.

When one of the input circuits IL1, . . . , ILM receives a cell, it requests free addresses from the management unit BMMU for respectively storing the sub-cells of this cell in the buffer memory BM. In order to optimize the use of the buffer memory BM, the sub-cells of the same cell are not stored in consecutive addresses, but in random addresses. The management unit BMMU particularly contains a read and write command circuit WRC, which stores the free addresses of the buffer memory BM as they are freed by the emission of cells, and contains a linking memory SLM that stores all the site addresses of the buffer memory BM, respectively storing all the sub-cells of the same cell. Each site of the buffer memory has a capacity of one sub-cell.

The buffer memory BM and the management unit BMMU design are the state of the art, since it is especially described in the European patent application EP 0,441,787, corresponding to International Publication No. WO 91/02420 and to U.S. Pat. No. 5,214,639. Preferably the buffer memory BM and the linking memory SLM have the same set of addresses, for ease of realization.

The request issued by one of the input circuits IL1, . . . , ILM is transmitted by the bus TDM1, then by the header treatment circuit HP, to the management unit BMMU. The latter assigns a series of free sites in the buffer memory BM to the sub-cells of the cell under consideration. A series of addresses designating these free sites is supplied by the circuit WRC. Links between the addresses of this series are formed by adding this series of addresses to consecutive addresses in the linking memory SLM. The management unit BMMU supplies a value FSA to the header treatment circuit HP, which is the first address of this series of site addresses in the buffer memory BM. The address FSA is retransmitted to the third output of circuit HP. This address FSA is written into the memory of addresses FSAM in a free site, whose address is furnished by the output of the unit CU.

This address FSA will ultimately permit finding the sub-cells of this cell in the buffer memory BM. By using this address FSA, it is possible to read, in the linking memory SLM, the address of a second sub-cell in the buffer memory BM. Then, with the address of this second sub-cell, it is possible to read, in the linking memory SLM, the address of a third sub-cell in the buffer memory BM. It is therefore possible to obtain the addresses of all the sub-cells of the same cell successively, starting with a unique address FSA. These addresses then permit to read the sub-cells themselves in the buffer memory BM.

From the cell control field of the first sub-cell of each received cell, the HP circuit extracts the field containing the time stamp TSTP, and a field containing the identity of the output, or outputs, OU1, ..., OUN, through which the cell is to be emitted. It supplies an identifier, called a waiting cell, which contains this information, to the first input of the command unit CU.

To emit a cell, the function of the command unit CU is triggered by the output circuits OL1, ..., OLN when one of these output circuits is available, in other words when it has finished emitting a cell. It sends a message IDL to the bus RQB; the message contains the identity of the available output and is addressed to the command unit CU. The command unit CU then determines which cell will be emitted through this output. The unit CU sends the address FSA' of a site in the buffer memory BM, which contains the first sub-cell of a cell, to the requesting output circuit. The output circuit then requests the buffer memory BM and its management unit BMMU to supply the complete series of sub-cells of this cell. It then emits the series through its output.

Figure 2:
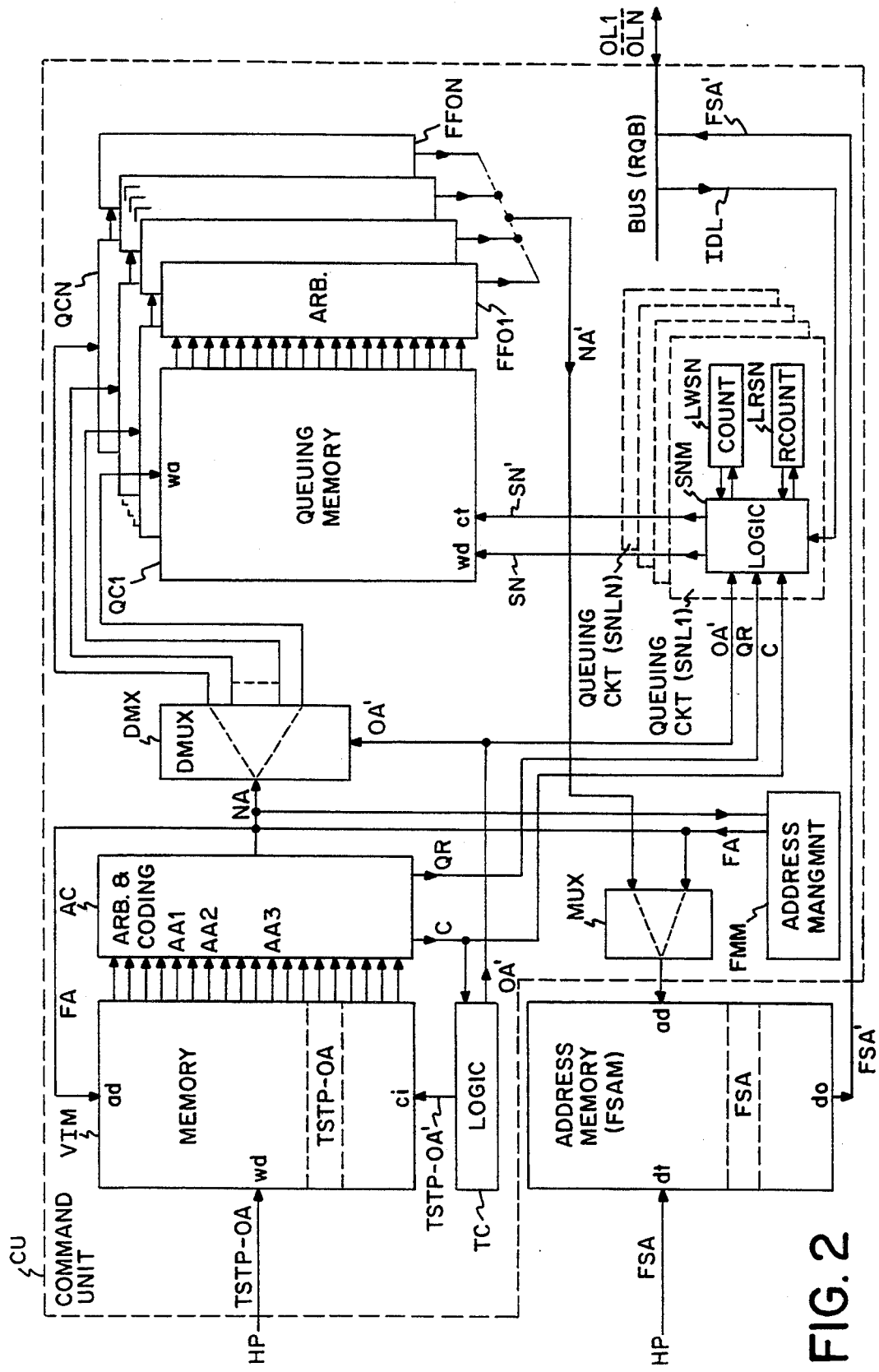
FIG. 2 represents a more detailed synoptic diagram of this configuration example.

FIG. 2 represents the synoptic diagram of a configuration example of the command unit CU, which contains:

- a memory VIM, called of waiting cells, of the type accessible by content, which has the same set of addresses as memories FSAM and BM, and which has a one-bit output for each memory site, where the number of sites is chosen as a function of the number N of outputs of the node, and the average waiting delay of the cells in the buffer memory BM;
- an arbitration and coding circuit AC, having a number of inputs linked respectively to the outputs of memory VIM;
- a demultiplexer DMX having: one data input, N outputs, and one command input;
- a logic circuit TC, called cell transfer command circuit;
- a multiplexer MUX having: two data inputs, one output, and a command input that is not shown;
- a logic circuit FMM called the address management circuit of memories VIM and FSAM;
- N queuing memories QC1, ..., QCN of the type accessible by content, having the same set of addresses as the memory VIM, and each queuing memory having a one-bit output for each memory site;
- N arbitration circuits FFO1, ..., FFON associated respectively with the N memories QC, ..., QCN, and each having a number of inputs connected respectively to the outputs of one of the memories QC1, ..., QCN;
- N logic circuits called queuing circuits SNL1, ..., SNLN associated respectively with the N memories QC1, ..., QCN;

The first input to the command unit CU, which receives a waiting cell identifier supplied by the header treatment circuit HP, is linked to one write data input 'wd', from the memory VIM The second input of the command unit CU, which receives the address FSA' furnished by the data output of memory FSAM, is linked to the bus RQB by an interface, not shown. The bus RQB is also linked by this interface to a first common input of queuing circuits SNL1, ..., SNLN, to supply a signal IDL to one of the circuits when the corresponding output circuit OL1, ..., OLN is available to emit a cell.

The waiting cell memory VIM furthermore contains: an address input 'ad' linked to an output of management circuit FMM; and one input called comparison input 'ci', linked to a first output of command transfer circuit TC. When a binary word is applied to the comparison input 'ci', the memory VIM compares this binary word with the binary words contained in its respective memory sites. When the comparison provides a positive result, the memory VIM supplies a bit with a value of 1 to the corresponding output of the memory site. If the comparison produces several positive results, the memory VIM supplies a bit with a value of 1 to each of the corresponding outputs of the memory sites having the positive results.

The arbitration and coding circuit AC has the function of coding each of these signals in the form of a binary word. Thus, a first output of circuit AC supplies a binary word NA whose value is addressed to the memory site under consideration. The first output of the arbitration and coding circuit AC is linked to the data input of demultiplexer DMX and to an input of management circuit FMM. If the comparisons produce several positive results, circuit AC codes them in succession, for example in descending order of address. The circuit AC possesses a second output which supplies a logic signal C to an input of the transfer command circuit TC, and to a second common input of the queuing circuits SLN1, ..., SNLN, when it has at least one positive result, and maintains it until the circuit AC has furnished all the addresses corresponding to these positive results. It furthermore has a third output linked to a third common input to all the queuing circuits SLN1, ..., SNLN for supplying to them a logic signal QR consisting of a pulse for each address furnished by the circuit AC.

A second output of the transfer command circuit TC is linked to the command input of demultiplexer DMX, and to a fourth common input of all queuing circuits SLN1, ..., SNLN.

The multiplexer MUX possesses a first input linked to a common output of arbitration circuits FFO1, ..., FFON; a second input linked to the output of the address management circuit FMM; an output that constitutes the output of the command unit CU, and linked to the read and write address input 'ad' in memory FSAM; and a command input, not shown, which is linked to an output of a not shown sequencer, which supplies command signals to all the elements of the command unit CU.

The demultiplexer DMX possesses N outputs linked respectively to write address inputs 'wa' of the queuing memories QC1, ..., QCN. Each of the queuing memories QC1, ..., QCN possesses: one comparison input 'ci' and one write data input 'wd', which are linked respectively to two outputs of queuing circuits SLN1, ..., SNLN, which correspond to the memory under consideration.

Each queuing circuit SLN1, ..., SNLN contains:
- a counter LWSN called the last written number counter;
- a counter LRSN called the last read number counter;
- and a logic circuit SNM to manage the numbers.

The counters LWSN and LRSN each have one command input and one output linked respectively to an output and an input of circuit SNM. Circuit SNM possesses four inputs which respectively constitute the first, second, third and fourth input of the queuing circuit; and two outputs that respectively constitute the two outputs of the queuing circuit.

Let us consider in succession the three large stages of the cell treatment by this resequencing device: the reception and placement in waiting in the waiting cell memory, then the research, the recovery and transfer to the queuing memory when the waiting delay has expired; and finally the emission when the intended output becomes available. To clarify, let us first suppose that the device only receives cells where each cell is intended for a single output represented by an address OA.

When a cell is received by the resequencing device, it is recorded in the buffer memory BM, and the buffer memory management unit BMMU supplies the address FSA of the site to the data input 'di' of memory FSAM, from the buffer memory BM containing the first sub-cell of this cell. Simultaneously, the header treatment circuit HP supplies a waiting cell identifier TSTP-OA to the write data input 'wd' of memory VIM. This identifier contains: a field TSTP, which is a time stamp indicating the time period during which the waiting delay will expire; and a field OA which designates the intended output of the cell.

The address management circuit FMM of memories VIM and FSAM supplies an available address FA to the write address input 'ad' of memory VIM, and to the address input 'ad' of memory FSAM, via the multiplexer MUX. The identifier TSTP-OA and the address of the first sub-cell FSA are then respectively recorded in the same address in memories VIM and FSAM. The waiting delay of a cell is equal to a whole multiple of the sub-cell period. At regular intervals, N times smaller than the sub-cell period, the first output of the command transfer circuit TC supplies an identifier TSTP'-OA' of a cell to be queued, which is composed of the value TSTP' of the time stamps of all the cells whose waiting delay expires during the current sub-cell period; and of the identity OA' of a unique output of the node.

Each identifier of a cell to be queued can potentially identify several cells, which are to be emitted from the same output, and whose waiting delays expire during the same sub-cell period. The expiration of its waiting delay authorizes a cell to be queued in symbolic form in the queuing memory that corresponds to the destination output. But it has not yet been authorized to be actually emitted.

The circuit TC contains a TSTPmax counter module that is incremented at each sub-cell period, and which is initialized in such a way that the TSTP' value it supplies is equal to the value of the current time stamp minus a predetermined delay, for example equal to the maximum transfer period of a cell in the switching network SW. In a particularly simple configuration example, the value of the TSTPmax module is made equal to the maximum transfer period of a cell in the switching network SW, which has the consequence that the TSTP' value is numerically equal to the value of the current time stamp TSTP, which permits using the same counter for the current time stamp generator TSG and the TSTP' counter in the transfer command circuit TC.

The transfer command circuit TC contains a second counter. It supplies N values of OA' for each sub-cell period. In this way the TC circuit determines N cell identifiers to be queued, TSTP'-OA' which consist of a same value TSTP' and N values of the output address OA', also taken successively from 1, ..., N, for example. The value of this output address is simultaneously supplied to the second output of the TC circuit, to be applied to the command input of the demultiplexer DMX and to the fourth common input of all queuing circuits SNL1, ..., SNLN.

Each identifier TSTP'-OA' is applied to the comparison input 'ci' of memory VIM, to find waiting cell identifiers TSTP-OA, if any, that correspond to this cell identifier to be queued. If the comparisons, performed by the memory VIM between the identifier TSTP'-OA' and the identifiers TSTP-OA it contains, produce positive results, there is a logic signal with a value of 1 at certain outputs of this memory. For example, each of the outputs corresponding to addresses AA1, AA2, AA3 of this memory supply a signal that indicates that these addresses contain identifiers TSTP-OA of waiting cells with the value of identifier TSTP'-OA' of cells to be queued.

The arbitration and coding circuit AC receives these signals and first supplies a binary word NA with the value of AA1 to the data input of demultiplexer DMX, and to the input of the address management circuit FMM. It further supplies a logic signal C to the transfer command circuit TC to indicate that at least one cell has been found, and it supplies a logic signal QR to queuing circuits SNL1, ..., SNLN to request that the found cell be queued. The address OA' is simultaneously supplied to queuing circuits SNL1, ..., SNLN in order to validate that it corresponds to the destination output of the found cell. In addition, the address OA' commands the demultiplexer DMX to transmit the address NA only to the queuing memory that corresponds to the destination output of the found cell.

The circuit AC then supplies an address NA with a value of AA2 by maintaining the signal C, and by renewing the signal QR that requests the queuing. Finally the circuit AC supplies an address NA equal to AA3, by maintaining the signal C, and by renewing the signal QR to request the queuing again. Finally the circuit AC suppresses the signal C to indicate to the circuit TC that all found cells have been queued, and it is then possible to increment the value of output address OA'. All the queuing operations for the N values of output address OA' must be performed during one sub-cell period, so as to enable incrementing the value of TSTP' at the same rate as the increment of the current time stamp TSTP values.

Each time a cell is queued, the site occupied by its identifier TSTP-OA in the memory VIM can be used again. That is why the address management circuit FMM of memories VIM and FSAM receives each value of address NA, to memorize it as an available address.

When one of the number management circuits SNM receives the logic signal C, being validated by an output address OA' which is actually its own, it increments by one unit, then reads the content of counter LWSN of the last written number. It then records the value SN of this content to the address NA in the queuing memory QC1, ..., or QCN corresponding to the output address OA'. Each pulse of the signal QR commands the recording of a value of NA in the same queuing memory.

In the example where NA successively takes the values of AA1, AA2, AA3, the order number SNi is recorded to the address AA1 in the queuing memory corresponding to the output address OA'. These operations are then repeated to treat the following address:

AA2. The same order number SNi is written to address AA2 in the same queuing memory. These operations are then repeated to treat the following address: AA3. In this way the order number SNi is recorded in the same queuing memory in address AA3.

When there is no cell to be queued, the circuit AC supplies no signal C and no signal QR. The value of the address NA supplied by the circuit AC is zero, but without significance. It is not taken into account because it has no positive result signal C nor a queuing request signal QR.

Let us now consider the emission of a cell when a destination output is available for that cell. The output circuit OU1, ..., OUN whose output is available emits a message to the bus RQB. A signal IDL corresponding to the available output arrives at the queuing circuit SNL1, ..., SNLN. The signal IDL commands the number management circuit SNM to increment by one unit and to read the content of the counter of the last number read, LRSN. This content constitutes a number SN' which will be searched in the queuing memory QC1, ..., QCN corresponding to the available output. The uniform increment of this number SN' ensures that the cells are recovered in the order they were numbered at the queuing time, in other words in the order defined by the values TSTP', the chronological order in which the cells are received by the node.

This number SN' is supplied to the comparison input 'ci' of the queuing memory. This memory supplies a logic signal to one or more of its outputs, according to whether there is one or more sites in this memory containing a number that is identical to the searched number SN'. The arbitration circuit FFO1, ..., FFON associated with the memory under consideration, supplies a binary word whose value equals successively the rank of each of the outputs of this memory supplying a signal. The values of these ranks represent the addresses NA' of the sites in the queuing memory that contain the searched number. These addresses NA' are successively restored in decreasing order of ranks, for example.

When several cells have the same time stamp, they are queued with the same order number SN, because their emission order may be any, without any drawbacks. The mode of realization described above has the advantage of needing a lower capacity of counters LWSN and LRSN than if a different order number had been assigned to each cell placed in a given queuing memory.

For example, if the searched number is SNi, which is memorized in three addresses AA1, AA2, AA3 in this memory, the arbitration circuit successively supplies the values AA1, AA2, AA3 of address NA' to the first input of the multiplexer MUX. The latter transmits these addresses to the memory FSAM for successively reading there three address values of the first sub-cell FSA'. Each value of address FSA' is transmitted by the bus RQB to the output circuit OL1, ..., or OLN having emitted the message that contains the signal IDL which indicates that an output is available. The output circuit retransmits these address values of the first cell FSA' via the bus TDM2, to the management unit BMMU of the buffer memory BM, for reading in this buffer memory all the sub-cells of three cells corresponding to the three address values FSA'. These sub-cells are then transmitted via bus TMD2 to this output circuit, which emits them through its output.

The function of this configuration example may be slightly modified to allow a cell to be diffused to several outputs. The unique output address OA is replaced by a binary word OM containing a number of bits that equals the number N of node outputs. Each designated output of the cell is indicated by a value 1, and each undesignated output is indicated by a value 0, for example. The waiting cell memory VIM stores the waiting cell identifiers TSTP-OM instead of the identifiers TSTP-OA.

The memory VIM possesses a comparison input 'ci', but it function somewhat differently than the memory VIM described previously, because the comparison can extend to the field TSTP' and to the single non-zero bit in OM'. The N−1 other bits in the OM' and their N−1 other bits that correspond to the field OM of memorized identifiers TSTP-OM, must not be compared. The bits of field OM in each word TSTP-OM must be masked by the bits of field OM' from TSTP-OM' before the comparison between the identifier TSTP'-OM' and each waiting cell identifier TSTP-OM takes place, as memorized in memory VIM.

The transfer command circuit TC is modified to supply queuing cell identifiers TSTP'-OM' in which the field TSTP' is still the identity of a time period during which the waiting delay expires, but where OM' is a word of N bits, among which a single bit has a value of 1. The rank of this bit designates a unique output, for which the circuit TC searches the cells to be queued.

The circuit TC contains a counter that successively furnishes the values 0 to $TSTP_{max}$, module $TSTP_{max}$, to form the field TSTP'; and a counter associated to a decoder which successively supplies N values for each field TSTP':

0000 ... 0001
0000 ... 0010
0000 ... 0100
...
1000 ... 0000 to form the field OM'. The other elements of the resequencing device are not modified.

Let us consider, for example, the case where there are N=8 outputs and where two cells have waiting delays that expire during the course of a same sub-cell period, characterized by the time stamp $TSTP_0$; and where the first cell is intended for the first and the fifth output, while the second cell is intended for the third and the fifth output. When the waiting delay of these cells expires, the transfer command circuit TC supplies a series of queuing cell identifiers TSTP'-OM', having the following values:

$TSTP_0$-0000 0001
$TSTP_0$-0000 0010
$TSTP_0$-0000 0100
...
$TSTP_0$-1000 0000

In this example, the circuit AC successively supplies:
1) a value AD1 of address NA corresponding to the first cell, accompanied by the positive result signal C and the queuing request signal QR;
2) a zero value of address NA, without the signal C and the signal QR;
3) a value AD2 of address NA corresponding to the second cell, accompanied by the signal C and the signal QR;
4) a zero value of address NA, without the signal C and the signal QR;
5) a value AD1 of address NA corresponding to the first cell, accompanied by a pulse of signal QR; immediately followed by the value AD2 of address NA corresponding to the second cell, accompanied by another pulse of signal QR; and a common signal C;

6, 7, 8) three successive values of address NA, which are zero, and which are not accompanied by the signal QR or the signal C.

In this example, a single order number is recorded in the queuing memory that corresponds to the fifth output, for the queuing of two cells.

A memory site of VIM and FSA must not be used again, as long as a cell has not been queued in the queuing memories of all the designated outputs. All the values of field OM', of identifier TSTP'-OM' are swept during a sub-cell period, consequently any address NA supplied by the circuit AC can be used again by the address management circuit FMM, starting with the following period.

The device according to the invention is applicable to fixed length cells or to cells containing a variable number of sub-cells, each having a fixed length. To prevent any cell desequencing, and any cell loss, it is necessary for the capacity of the counters LWSN and LRSN, which supply the order numbers SN and SN', to be larger than the maximum number of sub-cells which a cell may contain, increased by the number of sub-cell periods corresponding to the maximum transit time in the switching network SW.

To prevent any desequencing, but tolerating the possible loss of certain cells, it is possible not to fulfill the condition stated above, but in that case any excess of the counter LWSN with respect to counter LWRN must be detected, in order to block the queuing of new cells when a queuing memory is full, so as to keep the oldest cells and let the most recent ones get lost, and always restoring cells in good order.

A variation in the realization consists in assigning a time stamp TSTP to each cell leaving the network SW, instead of assigning it upon entering the network SW. In that case, the time stamp generator TSG is different. It still contains a clock that defines the constant time periods that are equal to one sub-cell period; and a module TSTPmax counter. But it also contains: a circuit for estimating the transit time of each cell through the network SW; a circuit for subtracting this estimate from the counter; and a circuit for adding the total delay, which each cell must undergo, to the result. The result of this calculation constitutes the stamp value TSTP, which indicates the time period during which the waiting delay of the cell expires. It can be used exactly like the stamp value TSTP assigned upon entering the network SW, in accordance with the above description. The realization of these circuits is at the state of the art.

The time unit is preferably chosen to be equal to the sub-cell period, since the duration of each cell is at least equal to one sub-cell period, but it is possible to use a smaller time unit.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Resequencing device (RU) for a node of a system for switching cells, each cell comprising a variable number of sub-cells of fixed length, said node comprising a switching network (SW) through which said cells are transmitted with first variable delays, all the sub-cells of a same cell being subjected to a same first delay; said resequencing device (RU) including means for storing all said cells that have been transmitted through said switching network and for then sending them to at least one output of said resequencing device after respective waiting delays constituting respective second delays having expired so that for each cell a sum of said first delay and said respective second delay is equal to a predetermined value substantially equal for all said cells; said means including:

a buffer memory (BM) responsive to a cell having been transmitted through said switching network, for storing all the sub-cells of said cell transmitted through said switching network and received by said resequencing device;

an address memory (FSAM) responsive to said storage of said cell in said buffer memory (BM), for storing an address (FSA) of a location of said buffer memory containing a first sub-cell of said cell;

means (TSG, IC1, ..., ICN, CU) responsive to said storage of said cell in said buffer memory (BM), for finding in said address memory a location containing an address (FSA') of said location of said buffer memory (BM) containing said first sub-cell of said cell when said waiting delay of said cell has expired and when an output on which said cell has to be sent is available;

wherein said means for finding said address (FSA') of said location of said buffer memory containing said first sub-cell of said cell includes:

a waiting-cell memory (VIM), addressable by its content, for storing a waiting-cell identifier (TSTP-OA) when said cell is stored in said buffer memory (BM); said waiting-cell identifier (TSTP-OA) being stored at a location of said waiting-cell memory (VIM) with an address (FA) identical to an address of said location of said address memory (FSAM) where said address (FSA) of said location of said first sub-cell in said buffer memory (BM) is stored; and said waiting-cell identifier including: a time label (TSTP) identifying a time slot period within which said waiting delay of said cell stored in said buffer memory (BM) will expire and an identity (OA; OM) of at least one output of said resequencing device to which said cell has to be sent;

means (TC, AC) responsive to said waiting-cell identifier, for finding in said waiting-cell memory (VIM) said waiting-cell identifier (TSTP-OA) of each cell when its waiting delay expires, and for providing for each thus found waiting-cell identifier said identity of said at least one output included in said waiting-cell identifier and an address (NA) of a location of said waiting-cell memory (VIM) containing said found waiting-cell identifier;

queuing memories (QC1, ..., QCN) respectively associated with the outputs of said resequencing device and addressable by their content, for storing in response to said output identity included in said waiting-cell identifier and to said address (NA) of said location of said waiting-cell memory (VIM) containing said found waiting-cell identifier, in a selected said queuing memory associated to an output having said output identity, a sequence number for each cell which has to be sent to said output having said output identity;

means (DMX, SNL1, . . . , SNLN) responsive to said address of said location of said waiting-cell memory (VIM), for determining and writing said sequence number in said selected queuing memory at said address (NA) provided by said means (TC, AC) for finding said waiting-cell identifier of each cell when its waiting delay expires;

means (SNL1, . . . , SNLN, FFO1, . . . , FFON) responsive to an output availability signal (IDL) provided by said outputs of said resequencing device and indicating whether a respective one of said outputs is available or not, for finding, in ascending order, each sequence number (SN') stored in said queuing memory when said output associated thereto becomes available; and for returning an address (NA') of a location of said queuing memory containing a found sequence number (SN');

means (MUX) responsive to said address returned by said means for finding each sequence number, for reading an address (FSA') of a location of a first sub-cell in said address memory (FSAM) at said address returned by said means (SNL1, . . . , SNLN, LRSN) for finding each number.

2. Resequencing device according to claim 1, wherein said means (TC, AC) for finding in said waiting-cell memory (VIM) said waiting-cell identifier of each cell when its waiting delay expires and for providing for each found waiting-cell identifier said output identity included in said waiting-cell identifier and said address (NA) of said waiting-cell memory (VIM) that contains said found identifier, comprise:

means (TC) for providing to a comparison input of said waiting-cell memory (VIM), at each time slot period corresponding to an expiring waiting delay, a sequence of cell-to-send identifiers (TSTP'-OA') each constituted by an identity (TSTP') of the current time slot period and by an identity (OA') of a single output of said resequencing device; said sequence including the identities (OA') of all the outputs of said resequencing device; and means (AC) responsive to said waiting-cell identifier, coupled to outputs of said waiting-cell memory (VIM) for successively providing each address (NA) of said waiting-cell memory containing a said found waiting-cell identifier.

3. (Amended) Resequencing device according to claim 1, wherein said means (DMX, SNL1, . . . , SNLN) for determining and writing said sequence number (SN) in said selected queuing memory (QC1, . . . , QCN) comprise, for each output of said resequencing device, a counter (LWSN) providing said sequence number (SN) which is incremented by one unit when at least one waiting-cell identifier is found in said waiting-cell memory (VIM) for a given time slot period and a given output of said resequencing device.

4. Resequencing device according to claim 1, wherein said means for finding each sequence number (SN') includes, for each output of said resequencing device, a counter (LRSN) providing said sequence number to be found (SN') which is incremented by one unit when said output of said resequencing device becomes available, said sequence number to be found (SN') being applied to a comparison input of said queuing memory (QC1, . . . , QCN) associated with said output of said resequencing device.

* * * * *

UNITED STATES PATENT AND TRADEMARK OFFICE
CERTIFICATE OF CORRECTION

PATENT NO. : 5,383,182
DATED : January 17, 1995
INVENTOR(S) : Therasse et al

It is certified that error appears in the above-indentified patent and that said Letters Patent is hereby corrected as shown below:

At column 16, line 13 (claim 3, line 1), please delete "(Amended)".

Signed and Sealed this

Eighteenth Day of April, 1995

*Attest:*

BRUCE LEHMAN

*Attesting Officer*  *Commissioner of Patents and Trademarks*